(12) United States Patent
Funamoto

(10) Patent No.: US 8,711,362 B2
(45) Date of Patent: Apr. 29, 2014

(54) SPECTROMETER

(75) Inventor: Tatsuaki Funamoto, Shiojiri (JP)

(73) Assignee: Seiko Epson Corporation (JP)

( * ) Notice: Subject to any disclaimer, the term of this patent is extended or adjusted under 35 U.S.C. 154(b) by 158 days.

(21) Appl. No.: 13/227,758

(22) Filed: Sep. 8, 2011

(65) Prior Publication Data
US 2012/0133948 A1    May 31, 2012

(30) Foreign Application Priority Data

Nov. 25, 2010  (JP) ................................. 2010-262758

(51) Int. Cl.
*G01J 3/45*    (2006.01)

(52) U.S. Cl.
USPC ......................................... 356/454; 356/451

(58) Field of Classification Search
USPC ................................................. 356/451, 454
See application file for complete search history.

(56) References Cited

U.S. PATENT DOCUMENTS

| | | | | |
|---|---|---|---|---|
| 7,286,244 B2 * | 10/2007 | Murata | ........................ | 356/519 |
| 7,654,685 B2 * | 2/2010 | Wan et al. | ..................... | 362/231 |
| 7,889,348 B2 * | 2/2011 | Tearney et al. | ................ | 356/451 |
| 8,094,294 B2 * | 1/2012 | Treado et al. | ................... | 356/73 |
| 2010/0245832 A1 * | 9/2010 | Saari | .............................. | 356/454 |
| 2012/0013910 A1 * | 1/2012 | Campbell | ..................... | 356/451 |

FOREIGN PATENT DOCUMENTS

| JP | 62-022034 | 1/1987 |
|---|---|---|
| JP | 2005-106753 | 4/2005 |
| JP | 2010-048640 | 3/2010 |
| JP | 2010-160025 | 7/2010 |

* cited by examiner

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

A spectrometer includes: a tungsten lamp which emits light with no peak wavelength within a wavelength range of visible light and having a light amount increasing as the wavelength becomes longer; a violet LED which emits light having a peak wavelength within the wavelength range of visible light; a light mixer which mixes light emitted from the tungsten lamp and the violet LED; an etalon which receives light mixed by the light mixer and transmits light contained in the received mixed light and having a particular wavelength; a light receiving unit which receives light transmitted by the etalon; and a measurement control unit which changes the wavelength of light that can pass through the etalon and measures spectral characteristics of the light having passed through the etalon based on the light received by the light receiving unit.

9 Claims, 8 Drawing Sheets

SPECTROMETER

This application claims priority to Japanese Patent Application No. 2010-262758 filed Nov. 25, 2010 which is expressly incorporated herein by reference in its entirety.

BACKGROUND

1. Technical Field

The present invention relates to a spectrometer which measures spectral characteristics of incident light.

2. Related Art

An analyzer which measures light characteristics (such as chromaticity and brightness) of incident light for each wavelength range of the light is known (for example, see JP-A-2005-106753).

The analyzer disclosed in JP-A-2005-106753 introduces light emitted from a light source and reflected by a sample into a wavelength variable interference filter, and guides light transmitted through the wavelength variable interference filter toward a photo-diode to receive the transmitted light thereon. Then, the analyzer detects current outputted from the photo-diode to measure the light characteristics. This type of analyzer changes light which can pass through the wavelength variable interference filter through regulation of the wavelength variable interference filter, thereby sequentially switching from received light to light having a desired wavelength and allowing the photo-diode to receive the desired light.

When the light source of the analyzer is constituted by a white light source such as a tungsten lamp which does not have its peak wavelength within the wavelength range of visible light, the light amount in the short wavelength range emitted from the light source decreases. In this case, the light amount in the short wavelength range of the entire range dividable by the wavelength variable interference filter may also decrease. Thus, the light amount in the short wavelength range received by the photo-diode further decreases, which lowers the measurement accuracy of the spectral characteristics in the short wavelength range and thus makes it difficult to perform accurate measurement of the spectral characteristics of the incident light.

SUMMARY

An advantage of some aspects of the invention is to provide a spectrometer capable of measuring spectral characteristics with high accuracy.

An aspect of the invention is directed to a spectrometer which divides light having a wavelength range of visible light including: a first light source which emits light with no peak wavelength within the wavelength range of visible light and having a light amount increasing as the wavelength becomes longer; a second light source which emits light having a peak wavelength within the wavelength range of visible light; a light mixer which mixes light emitted from the first light source and the second light source; a wavelength variable interference filter which receives light mixed by the light mixer and transmits light contained in the received mixed light and having a particular wavelength; a light receiving unit which receives light transmitted by the wavelength variable interference filter; and a measurement control unit which changes the wavelength of light that can pass through the wavelength variable interference filter and measures spectral characteristics of the light having passed through the wavelength variable interference filter based on the light received by the light receiving unit.

According to this aspect of the invention, the spectrometer includes the first light source which emits light without a peak wavelength in the wavelength range of visible light and having a light amount increasing as the wavelength becomes longer, the second light source which emits light having the peak wavelength within the wavelength range of visible light, and the light mixer which mixes light emitted from the respective light sources. After the mixture of the light emitted from the respective light sources by using the light mixer, the light receiving unit receives test target light transmitted by the wavelength variable interference filter, and the measurement control unit measures the spectral characteristics of the test target light. When only the first light source which does not have a peak wavelength within the wavelength range of visible light is used, the light amount within a specific range in the wavelength range of visible light considerably decreases as explained above. According to this aspect of the invention, however, the second light source which emits light having the peak wavelength particularly in a short wavelength range (wavelength range where the light amount from the first light source decreases), for example, can effectively compensate for the light amount in the short wavelength range where the light amount from the first light source considerably drops. Accordingly, the measurement accuracy of the spectral characteristics in the wavelength range where the light amount decreases can improve, which contributes to highly accurate measurement of the spectral characteristics.

It is preferable that the second light source of the spectrometer has a peak wavelength within the range from 385 nm to 450 nm.

When the first light source which emits light having a small light amount in a short wavelength range such as a tungsten lamp is used under the condition in which the wavelength variable range of the wavelength variable interference filter is set at 380 nm to 780 nm, the light amount from the first light source decreases particularly in the short wavelength range. Thus, compensation for the light amount in the short wavelength range is desired for performing highly accurate spectral characteristics measurement. According to this structure, the second light source which has the peak wavelength in the range from 385 nm to 450 nm is provided to compensate for the light amount in the short wavelength range. Thus, the light amount in the short wavelength range sufficiently increases, which raises the accuracy of the spectral characteristics measurement.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

1. General Structure of Spectrometer

Figure 1:
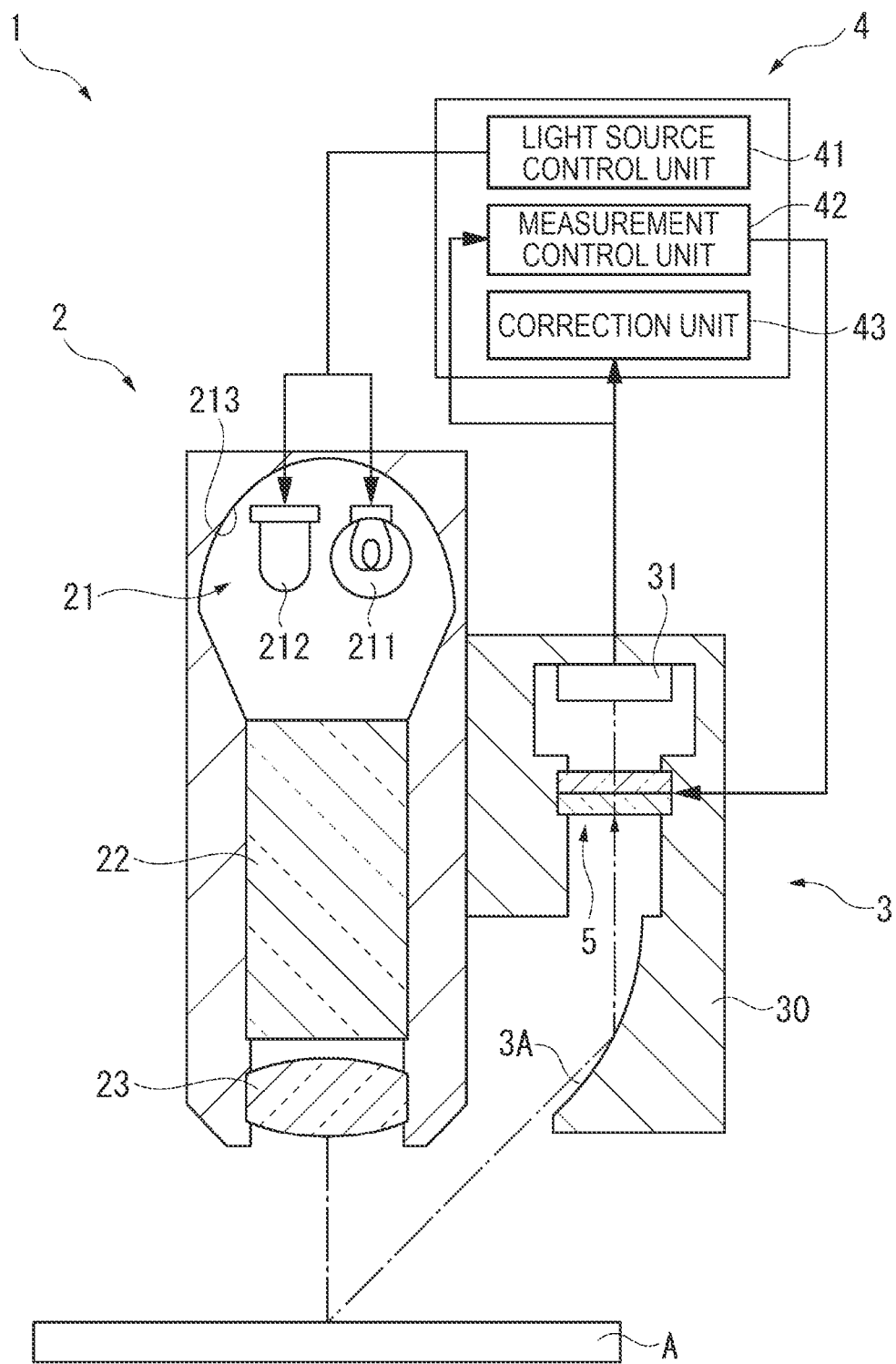
FIG. 1 illustrates the general structure of a spectrometer according to a first embodiment of the invention.

FIG. 1 illustrates the general structure of a spectrometer 1 according to the first embodiment.

As illustrated in FIG. 1, the spectrometer 1 includes a light source device 2 which emits light toward a test target A, a dividing device 3 which has an etalon 5 (e.g., wavelength variable range: 380 nm to 780 nm) for dividing test target light reflected by the test target A, and a control device 4 which controls the overall operation of the spectrometer 1. The spectrometer 1 is a system which divides test target light emitted from the light source device 2 and reflected by the test target A by using the dividing device 3, and measures the respective amounts of divided light having different wavelengths based on detection signals outputted from the dividing device 3.

The spectrometer 1 is also a system which only turns on a violet LED 212 (described later) of the light source device 2 to carry out wavelength correction of the etalon 5. In this case, a white standard reflection plate is used as the test target A. The details of the wavelength correction for the etalon 5 will be described later.

2. Structure of Light Source Device

As illustrated in FIG. 1, the light source device 2 includes a light source unit 21, a light mixer 22, and a lens 23 as components combined into one body.

The light source unit 21 has a tungsten lamp 211 emitting white light (first light source), the violet LED (light emitting diode) 212 (second light source), and a reflector 213 which reflects light emitted from the tungsten lamp 211 and the violet LED 212. The light source device 2 turns on both the tungsten lamp 211 and the violet LED 212 at the time of spectrometry of the test target light, and only turns on the violet LED 212 at the time of wavelength correction of the etalon 5.

The light mixer 22 as a cylindrical or pillar shaped component made of quartz glass or acrylic resin, for example, mixes the light emitted from the tungsten lamp 211 and the violet LED 212, that is, combines the light reflected by the reflector 213 by multiple reflections within the light mixer 22.

The lens 23 collimates the light after multiple reflections by the light mixer 22, and supplies the collimated light toward the test target A.

Figure 2:
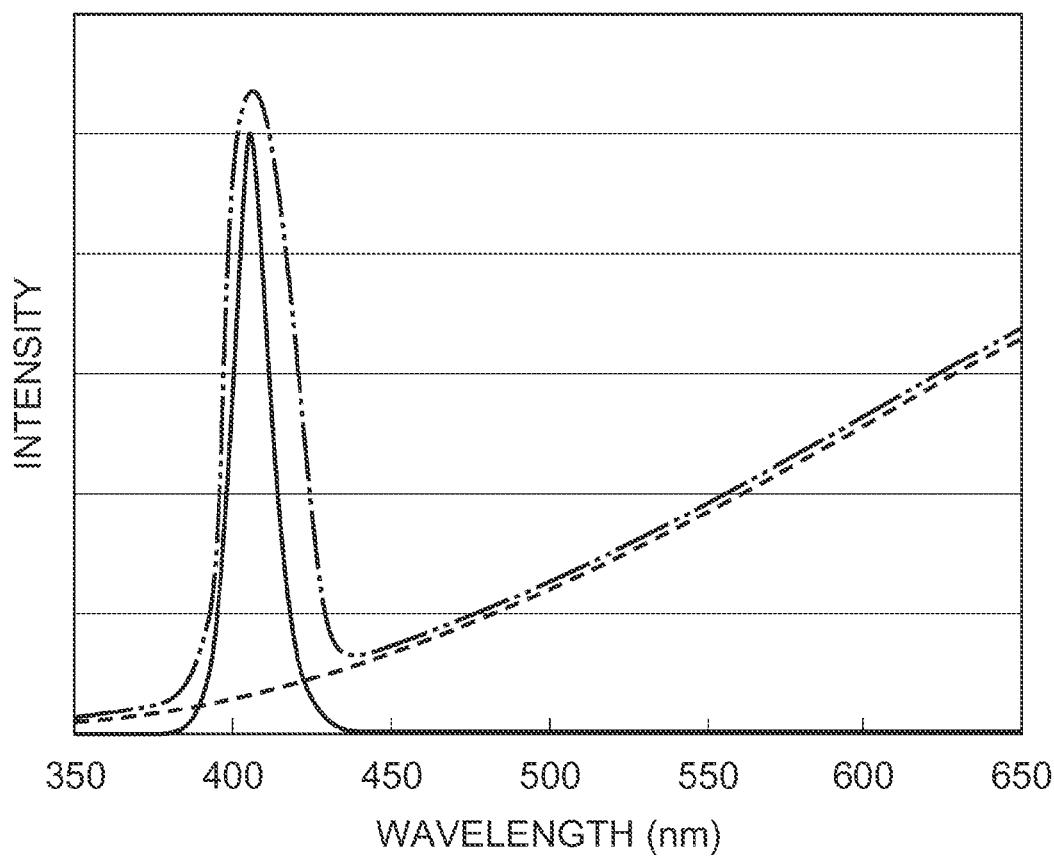
FIG. 2 is a graph showing spectral distribution of a light source unit according to the first embodiment.

FIG. 2 is a graph showing the spectral distribution of light produced by the light source unit 21 according to this embodiment.

The tungsten lamp 211 has the spectral distribution indicated by a broken line in FIG. 2. As can be seen from the figure, the amount of light emitted from the tungsten lamp 211 increases as the wavelength becomes longer. Thus, the light amount is small in the short wavelength range around 400 nm.

On the other hand, the violet LED 212 has the spectral distribution indicated by a solid line in FIG. 2. As can be seen from the figure, the violet LED 212 has a spectral distribution in the wavelength range from about 385 nm to about 430 nm, and has a peak wavelength corresponding to the maximum light amount at the 405 nm wavelength.

In this case, the light emitted from the tungsten lamp 211 and the violet LED 212 and mixed by the light mixer 22 obtain the spectral distribution indicated by an alternate long and two short dashes line in FIG. 2. Thus, the violet LED 212 can effectively compensate for the light amount at the wavelength of 400 nm where the light amount emitted from the tungsten lamp 211 decreases (e.g., is low).

3. Dividing Device Structure

As illustrated in FIG. 1, the dividing device 3 includes a device main body 30 which has a concave mirror 3A for reflecting the test target light reflected by the test target A such that the test target light can travel in a predetermined direction and converge on the etalon 5. The device main body 30 has the etalon 5 (wavelength variable interference filter) which divides test target light received from the concave mirror 3A, and a light receiving unit 31 which receives light having respective wavelengths after division by the etalon 5.

3-1. Light Receiving Unit Structure

The light receiving unit 31 is a light receiving element functioning as a light detector, which is constituted by a photo-diode, a photo-IC or the like. When receiving test target light transmitted through the etalon 5, the light receiving unit 31 generates an electric signal corresponding to the amount of the received test target light. Then, the light receiving unit 31 connected with the control device 4 outputs the generated electric signal to the control device 4 as a light reception signal.

Generally, a light receiving element has lower sensitivity for light reception in the short wavelength range than in the long wavelength range. In this embodiment, therefore, the violet LED 212 which has a peak wavelength particularly in the short wavelength range as shown in FIG. 2 is employed to improve the sensitivity for light reception in the short wavelength range.

3-2. Etalon Structure

Figure 3:
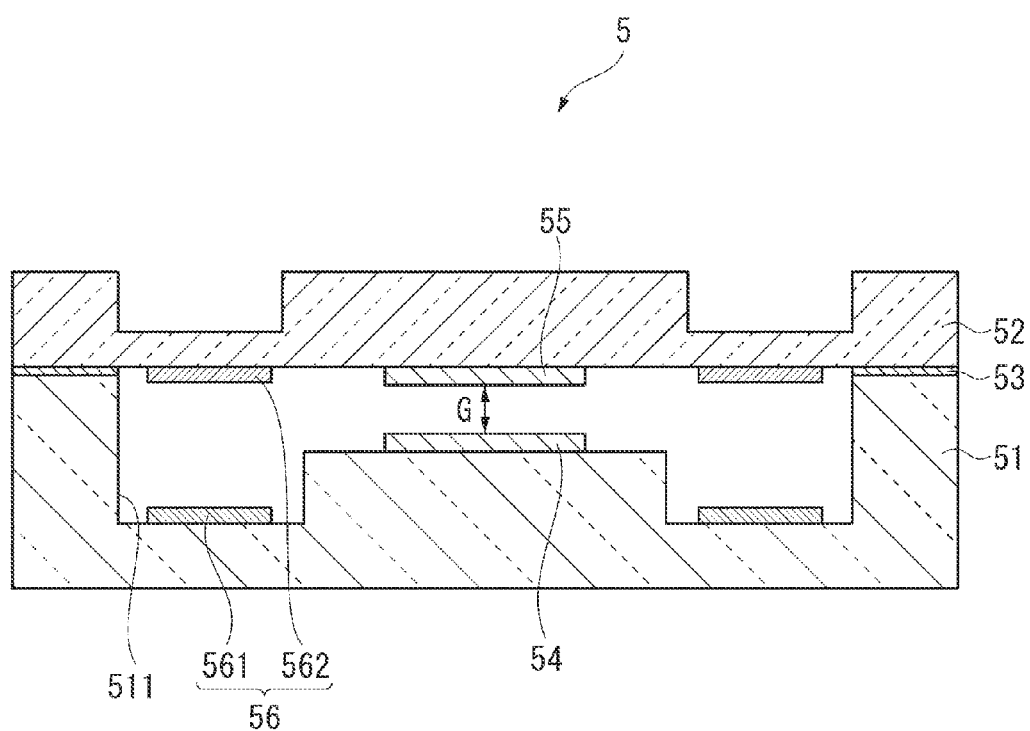
FIG. 3 is a cross-sectional view illustrating the general structure of an etalon according to the first embodiment.

FIG. 3 is a cross-sectional view illustrating the general structure of the etalon 5.

The etalon 5 is a plate-shaped optical component which has a substantially square shape in plan view, and each side of which is 10 mm long, for example. As illustrated in FIG. 3, the etalon 5 has a fixed substrate 51 and a movable substrate 52. These substrates 51 and 52 are joined to each other with a junction layer 53 interposed therebetween by a siloxane junction which uses a plasma polymer film or by other methods, so that the substrates 51 and 52 can be combined into one body. Each of the two substrates 51 and 52 is made of glass such as soda glass, crystal glass, and quartz glass, or crystal, for example.

A fixed mirror 54 and a movable mirror 55 are provided between the fixed substrate 51 and the movable substrate 52. The fixed mirror 54 is fixed to the surface of the fixed substrate 51 opposed to the movable substrate 52, while the movable mirror 55 is fixed to the surface of the movable substrate 52 opposed to the fixed substrate 51. The fixed mirror 54 and the movable mirror 55 are disposed opposite to each other with a gap G left therebetween.

An electrostatic actuator 56 is provided between the fixed substrate 51 and the movable substrate 52 for controlling the gap G between the fixed mirror 54 and the movable mirror 55.

The fixed substrate 51 is manufactured from a glass material which is 500 μm thick, for example, by etching. As illustrated in FIG. 3, an electrode forming groove 511 is formed on the fixed substrate 51 by etching so that a first electrode 561 constituting the electrostatic actuator 56 can be disposed within the electrode forming groove 511. The first electrode 561 is connected with the control device 4 (see FIG. 1) via an electrode extension member (not-shown).

The movable substrate 52 is manufactured from a glass material which is 200 μm thick, for example, by etching. A second electrode 562 constituting the electrostatic actuator 56 is provided on the movable substrate 52 in such a position so as to be opposed to the first electrode 561 with a predetermined gap left therebetween. The second electrode 562 is connected with the control device 4 (see FIG. 1) via an electrode extension member (not-shown).

According to this structure, the length of the gap G is controlled by an electrostatic attractive force produced between the first electrode 561 and the second electrode 562 in response to voltage outputted from the control device 4, so that the wavelength of light allowed to pass through the etalon 5 can be determined in accordance with the length of the gap G. That is, light which can pass through the etalon 5 is determined by the gap length controlled by the function of the electrostatic actuator 56, so that only the light having passed through the etalon 5 can be received by the light receiving unit 31.

4. Control Device Structure

The control device 4 controls the overall operation of the spectrometer 1. The control device 4 is constituted by a general-purpose personal computer, a mobile information terminal, or a computer used exclusively for colorimetry, for example.

As illustrated in FIG. 1, the control device 4 includes a light source control unit 41, a measurement control unit 42, and a correction unit 43. The control device 4 further includes a memory unit (not-shown) as a recording medium such as a memory or a hard disk which stores transmission characteristics data (V-λ data) showing wavelengths of transmission light for driving voltages.

The light source control unit 41 is connected with the light source unit 21. The light source control unit 41 outputs a predetermined control signal to the light source unit 21 based on a setting input for initiating a spectral characteristics measuring process received from a user, for example, and allows the tungsten lamp 211 and the violet LED 212 of the light source unit 21 to emit light having predetermined brightness. Moreover, the light source control unit 41 outputs a predetermined control signal to the light source unit 21 based on a setting input for initiating wavelength correction of the etalon 5 received from the user, for example, and allows only the violet LED 212 of the light source unit 21 to emit light.

As explained above, the measurement control unit 42 is connected with the first electrode 561 and the second electrode 562 of the etalon 5. The measurement control unit 42 applies driving voltage to the first electrode 561 and the second electrode 562 to vary the length of the gap G of the etalon 5 and switch the wavelength of light which can pass through the etalon 5.

The measurement control unit 42 is connected with the light receiving unit 31 to perform a process for measuring spectral characteristics of test target light.

In the spectral characteristics measuring process, the measurement control unit 42 calculates the light reception amount for each wavelength based on the light reception signal received from the light receiving unit 31 to conduct the process for measuring the spectral characteristics of the test target light.

The correction unit 43 is connected with the light receiving unit 31 to perform a wavelength correction process for the etalon 5.

In the wavelength correction of the etalon 5, the correction unit 43 calculates the relationship between the light reception signal and the driving voltage based on the reception of the light reception signal inputted from the light receiving unit 31 for each driving voltage. Then, the correction unit 43 calculates the driving voltage corresponding to 405 nm as the peak wavelength of the violet LED 212 to conduct the wavelength correction of the etalon 5 (correction of transmission characteristics data mentioned above).

5. Etalon Correction

As noted above, the spectrometer 1 measures spectral characteristics of test target light having passed through the etalon 5, and also carries out wavelength correction of the etalon 5 by only turning on the violet LED 212. The wavelength correction of the etalon 5 is herein explained with reference to a flowchart shown in FIG. 4.

The coefficient of linear expansion of the etalon 5 which is dependent on the temperatures of the mirrors 54 and 55 and the electrodes 561 and 562 varies with the change of the environment temperature. Thus, the substrates 51 and 52 may be bent in accordance with the change of the internal stresses of the mirrors 54 and 55 and the electrodes 561 and 562 produced by the change of the environment temperature. In this case, the length of the gap G between the mirrors 54 and 55 varies, which makes it difficult to obtain a desired transmission wavelength. It is therefore preferable that the length of the gap G (transmission wavelength) for each driving voltage is determined beforehand under the condition of the etalon 5 installed at a predetermined environment temperature.

The specific steps of the process are now explained. Initially, the light source control unit 41 turns on only the violet LED 212 (step S1). The measurement control unit 42 varies driving voltage by 0.1V at a time, for example (step S2). The light receiving unit 31 receives test target light reflected by the test target A for each driving voltage, and produces an electric signal corresponding to the amount of the received test target light. Based on this signal, the correction unit 43 acquires data shown in FIG. 5 which represents the relationship between the current of the electric signal produced by the light receiving unit 31 and the voltage (driving voltage) (step S3).

Figure 5:
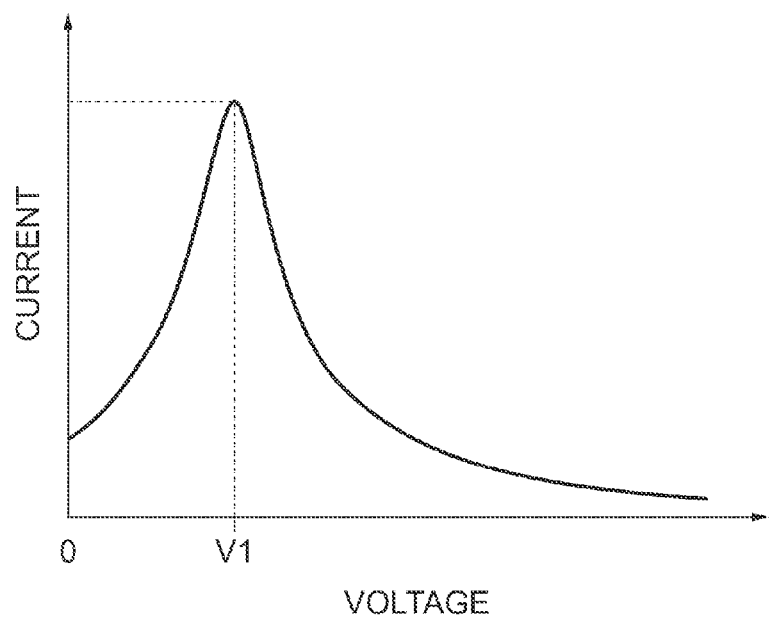
FIG. 5 is a graph showing the relationship between current of an electric signal produced by a light receiving unit and driving voltage according to the first embodiment.

After step S3, the correction unit 43 acquires a voltage V1 corresponding to the maximum current based on the data shown in FIG. 5 (step S4). The wavelength obtained when the voltage V1 is applied is 405 nm (peak wavelength of violet LED 212).

Then, the correction unit 43 reads the V-λ data from the memory unit for correction (step S5).

The change pattern of the V-λ data dependent on the environment temperature and other factors (such as the change of gravity produced by the change of the position of the etalon 5) can be simulated beforehand.

Figure 6:
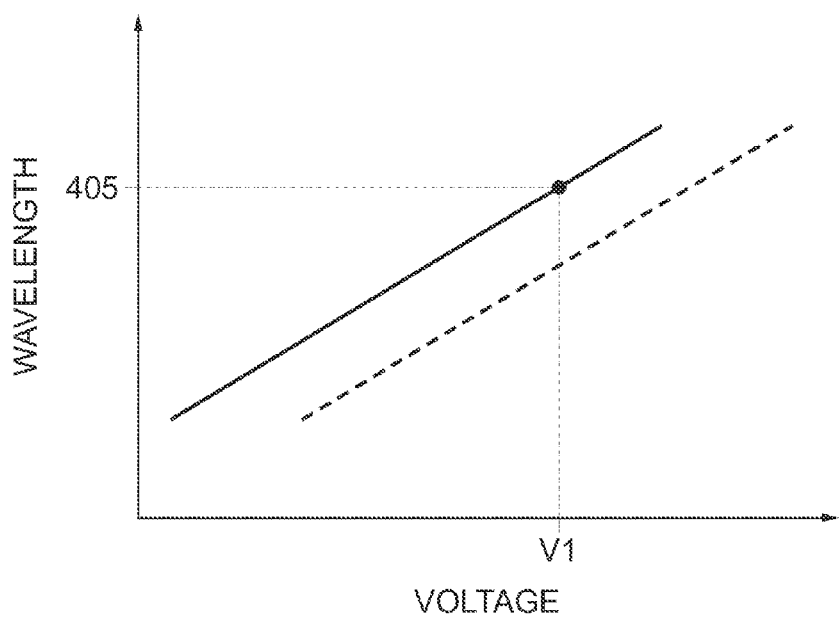
FIG. 6 illustrates wavelength correction for the etalon according to the first embodiment.

FIG. 6 shows a constant wavelength change in accordance with the change of the environment temperature. More specifically, data before correction is indicated by a broken line, and data after correction is indicated by a solid line in the figure. As can be seen from FIG. 6, correction of only one point of the V-λ data is needed. Thus, the correction unit 43 corrects the wavelength corresponding to the driving voltage V1 to 405 nm under a predetermined environment temperature.

6. Advantages

According to this embodiment, the spectrometer 1 includes the tungsten lamp 211 which does not have a peak wavelength within the wavelength range of visible light, the violet LED 212 which has a peak wavelength within the wavelength range of visible light, and the light mixer 22 which mixes light emitted from the respective light sources 211 and 212. After the mixture of the light emitted from the respective light sources 211 and 212 by the light mixer 22, the light receiving unit 31 receives test target light transmitted through the etalon 5, and the measurement control unit 42 measures the spectral characteristics of the test target light. When only the tungsten lamp 211 which does not have a peak wavelength within the wavelength range of visible light is used, the light amount in the short wavelength range of the wavelength range of visible light considerably decreases as explained above. According to this embodiment, however, the violet LED 212 having the peak wavelength particularly in the short wavelength range is also provided. In this case, the light emitted from the light sources 211 and 212 and mixed with each other can effectively compensate for the light amount within the short wavelength range where the light amount of the tungsten lamp 211 considerably drops. Accordingly, the measurement accuracy of the spectral characteristics in the short wavelength range where the light amount decreases is improved, which contributes to highly accurate measurement of the spectral characteristics.

Moreover, the violet LED 212 which has a peak wavelength at 405 nm can compensate for the light amount in the short wavelength range. Thus, the light amount in the short wavelength range sufficiently increases, which raises the accuracy of the spectral characteristics measurement.

Second Embodiment

Figure 7:
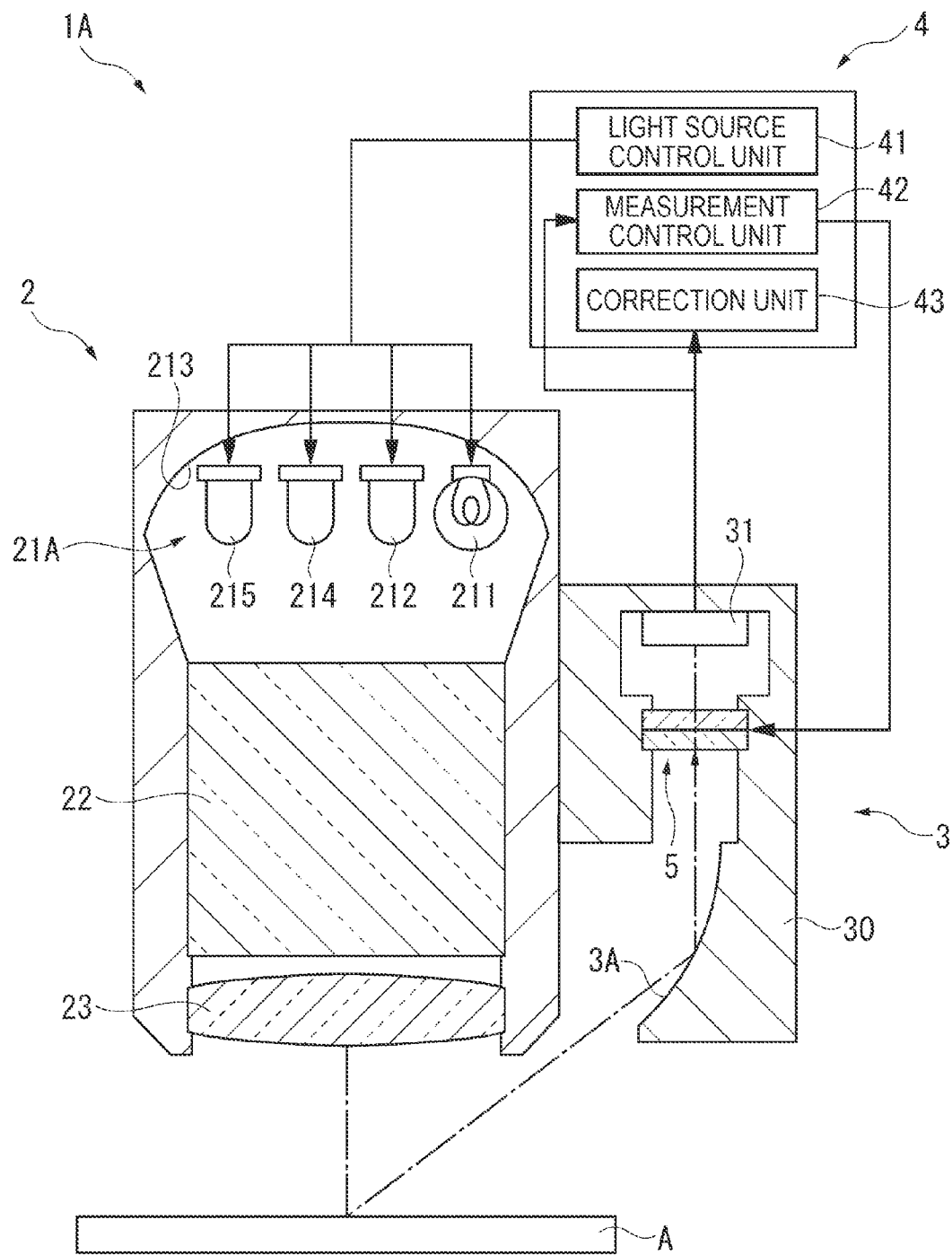
FIG. 7 illustrates the general structure of a spectrometer according to a second embodiment of the invention.

FIG. 7 illustrates the general structure of a spectrometer 1A in a second embodiment.

According to the first embodiment, the light source unit 21 includes a pair of light sources constituted by the tungsten lamp 211 and the violet LED 212. In this embodiment, however, a light source unit 21A includes a blue LED 214 and a green LED 215 in addition to the light sources 211 and 212 as four light sources 211, 212, 214, and 215.

Figure 8:
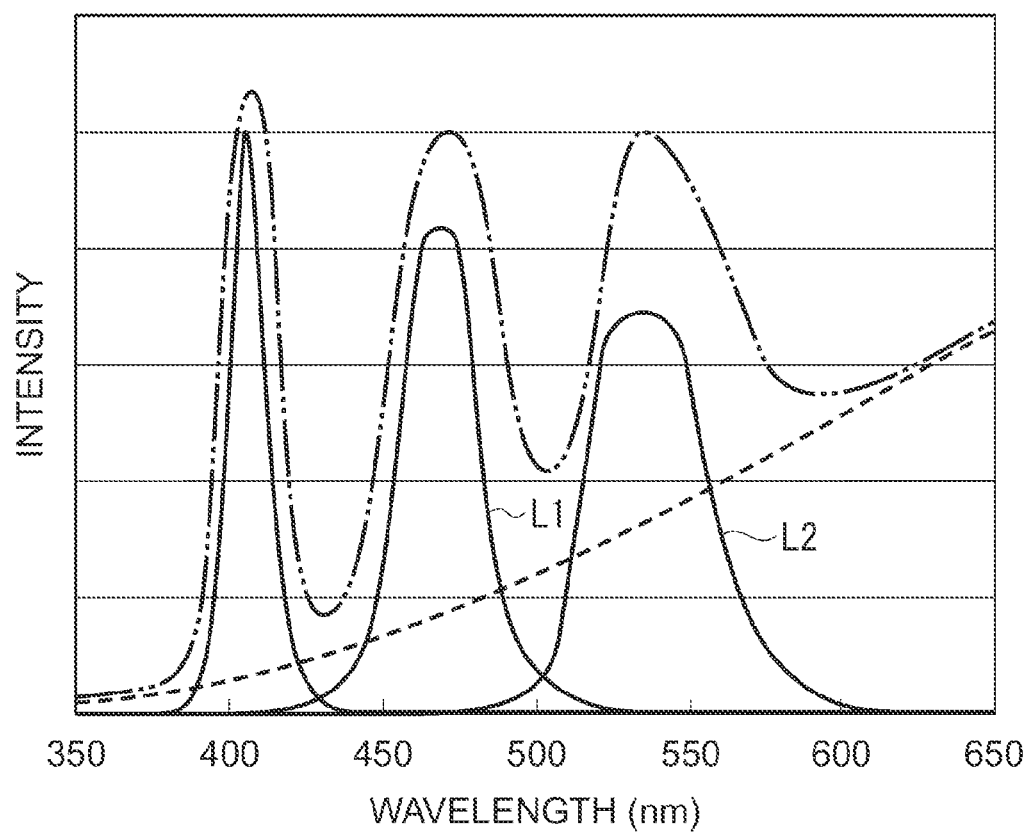
FIG. 8 is a graph showing spectral distribution of a light source unit according to the second embodiment.

FIG. 8 is a graph showing the spectral distribution of light emitted from the light source unit 21A in this embodiment.

The blue LED 214 has the spectral distribution indicated by a solid line L1 in FIG. 8. As shown in the figure, the blue LED 214 has a spectral distribution within the range from about 420 nm to about 525 nm, and has a peak wavelength at 470 nm where the light amount becomes maximized.

The green LED 215 has the spectral distribution indicated by a solid line L2 in FIG. 8. As shown in the figure, the green LED 215 has a spectral distribution within the range from about 480 nm to about 610 nm, and has a peak wavelength at 530 nm where the light amount becomes maximized.

The intensities of the peak wavelengths of the violet LED 212, the blue LED 214, and the green LED 215 are designed to decrease as the wavelengths increase.

Therefore, when light emitted from the tungsten lamp 211, the violet LED 212, the blue LED 214, and the green LED 215 are mixed by the light mixer 22, the spectral distribution indicated by an alternate long and two short dashes line in FIG. 8 is produced. According to this spectral distribution, the violet LED 212 compensates for the light amount around the 400 nm wavelength where the light amount emitted from the tungsten lamp 211 is small, and the blue LED 214 and the green LED 215 compensate for the light amount of the tungsten lamp 211 in the range from the short wavelength to the long wavelength. Thus, the light amount in the visible light range increases more than the corresponding amount in the first embodiment.

The spectrometer 1A having the light source unit 21A thus constructed performs wavelength correction of the etalon 5 in the following manner. The wavelength correction of the etalon 5 in this embodiment executed when a wavelength change of the etalon 5 is produced by the change of the position of the etalon 5 (change of gravity) or the like as well as by the change of the environmental temperature is now explained.

Figure 9:
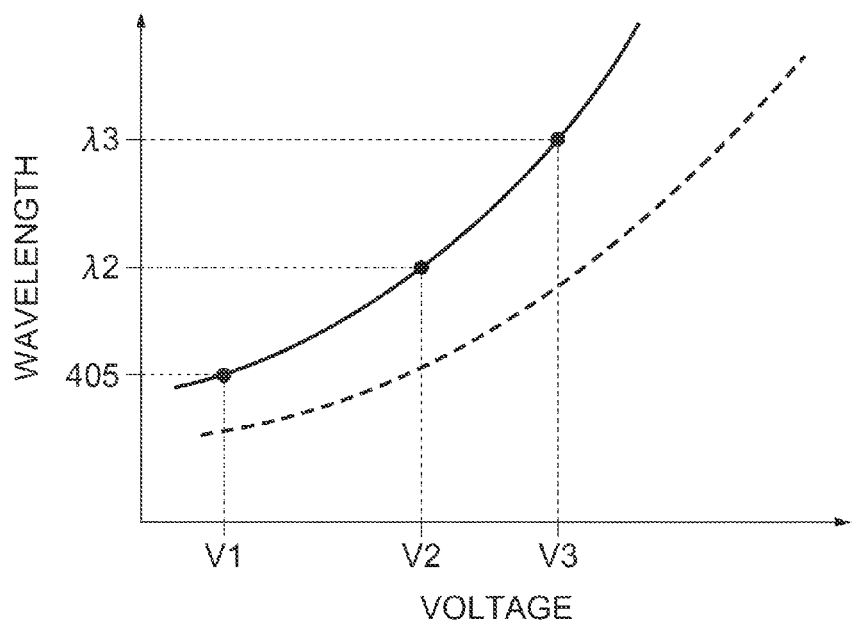
FIG. 9 illustrates wavelength correction for an etalon according to the second embodiment.

As noted above, the change pattern of the V-λ data can be simulated beforehand. When the wavelength change is produced by the change of gravity or the like as well as by the change of the environment temperature, at least three points of the V-λ data need to be corrected as shown in FIG. 9. Thus, the correction unit 43 corrects the wavelength of the etalon 5 by using the blue LED 214 and the green LED 215 as well as the violet LED 212.

Figure 4:
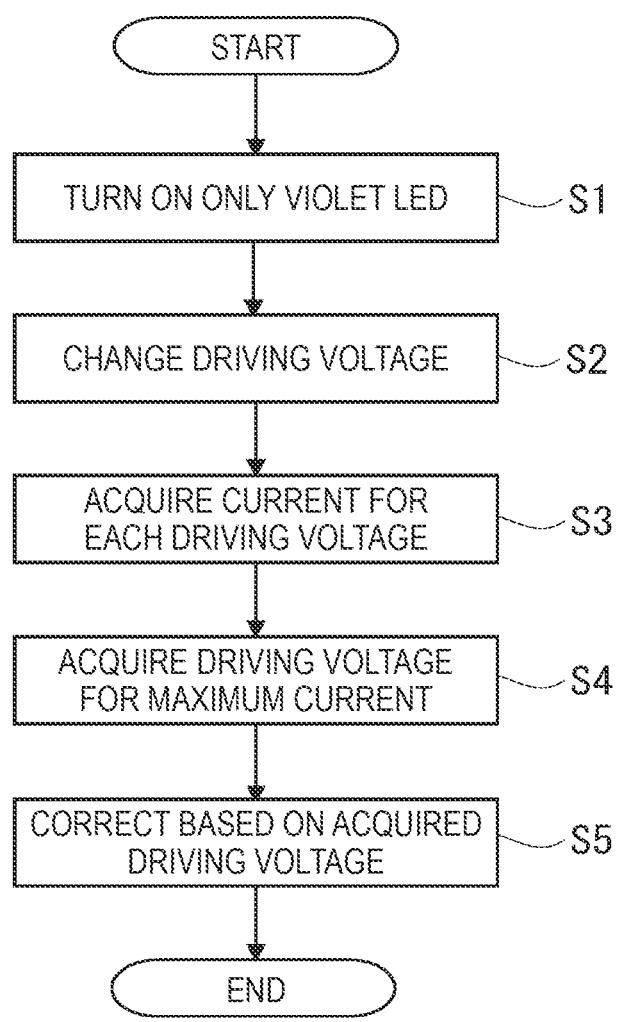
FIG. 4 is a flowchart showing a wavelength correction process executed for the etalon according to the first embodiment.

For the wavelength correction, the specific steps from step S1 to step S5 shown in FIG. 4 are executed similarly to the first embodiment. In this embodiment, however, the steps from step S1 to step S5 shown in FIG. 4 are carried out for each of the blue LED 214 and the green LED 215 as well as for the violet LED 212.

By this method, as shown in FIG. 9 the correction unit 43 corrects the wavelength corresponding to the driving voltage V1 included in the data before correction indicated by a broken line to 405 nm, corrects the wavelength corresponding to a driving voltage V2 included in the data before correction as the voltage where the current of the blue LED 214 becomes maximized to a wavelength λ2 (peak wavelength of blue LED 214), and corrects the wavelength at a driving voltage V3 included in the data before correction as the voltage where the current of the green LED 215 becomes maximized to a wavelength λ3 (peak wavelength of green LED 215) to obtain data after correction indicated by a solid line in the figure.

According to the second embodiment, the following advantages can be offered as well as the advantages of the first embodiment.

According to this embodiment, the light source unit 21A has the four light sources 211, 212, 214, and 215. Thus, the accuracy of the wavelength correction of the etalon 5 in case of a wavelength change can be raised by using the three light sources 212, 214, and 215 which have peak wavelengths in the wavelength range of visible light.

Moreover, the respective intensities of the peak wavelengths of the violet LED 212, the blue LED 214, and the green LED 215 are designed to decrease as the wavelengths increase. Thus, considerable decrease in the light amount for each wavelength can be avoided by light mixture achieved by the light mixer 22. Accordingly, the accuracy of the spectral characteristics measurement further improves.

Modifications of Embodiment

The invention is not limited to the embodiments described herein but may be practiced otherwise without departing from the scope of the invention. Thus, modifications, improvements and the like including the following changes can be made.

Figure 10:
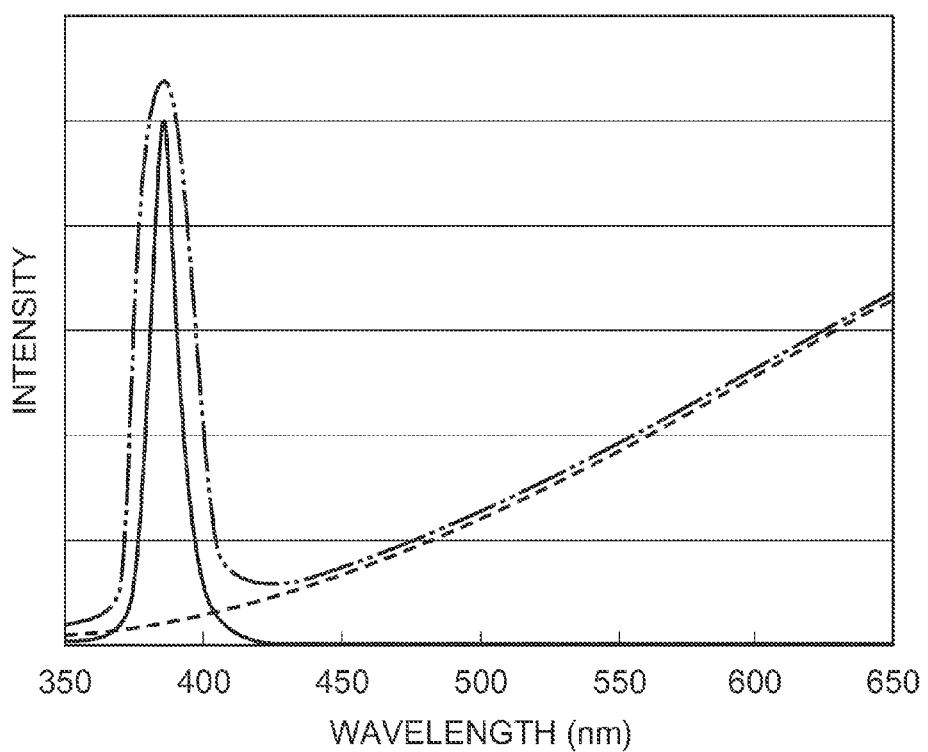
FIG. 10 is a graph showing spectral distribution of a light source unit according to a modified example of the invention.

According to the respective embodiments, a second light source is constituted by the violet LED 212. However, the second light source may be other light sources as long as they have a peak wavelength within the wavelength range from about 385 nm to about 450 nm. For example, the second light source may be an ultraviolet LED whose peak wavelength is 385 nm. In this case, the spectral distribution shown in FIG. 10 is produced as light which can effectively compensate for the light amount around 400 nm where the light amount emitted from the tungsten lamp 211 is small.

According to the respective embodiments, the structure of the etalon 5 whose gap G between the mirrors can be controlled by using the electrostatic actuator 56 has been discussed. However, the gap G may be controlled by using an electromagnetic actuator having an electromagnetic coil and a permanent magnet, or a piezoelectric device capable of expanding and contracting when voltage is applied thereto, for example.

According to the respective embodiments, the substrates 51 and 52 are joined to each other via the junction layer 53. However, the junction surfaces between the respective substrates 51 and 52 may be joined to each other by a so-called cold activation junction which activates the junction surfaces of the substrates 51 and 52, overlaps the activated junction surfaces, and pressurizes the overlapped surfaces for junction, for example without forming the junction layer 53. The junction method for this purpose may be arbitrarily selected.

According to the respective embodiments, the thickness of the movable substrate 52 is set at 200 μm, for example. However, the thickness of the movable substrate 52 may be 500 μm equal to the thickness of the fixed substrate 51. In this case, the thickness of a movable portion 521 increases to 500 μm as well, which reduces bending of the movable mirror 55 and maintains the parallelism of the mirrors 54 and 55 in a more preferable condition.

While the spectrometer 1 for measuring respective light amounts of light having different wavelengths divided from test target light has been discussed in the embodiments, the spectrometer 1 is applicable to a colorimeter which measures chromaticity of test target light, i.e., a colorimeter which analyzes and measures colors of test target A, a spectral camera, or a spectral analyzer.

What is claimed is:

1. A spectrometer comprising:
   a first light source which emits first light with no peak wavelength within a wavelength range of visible light and having a light amount increasing as a wavelength of the first light becomes longer within the wavelength range of visible light;
   a second light source which emits second light having a peak wavelength within the wavelength range of visible light;
   a light mixer which mixes the first light and the second light into mixed light;
   a wavelength variable interference filter which receives the mixed light and transmits particular light contained in the mixed light having a particular wavelength;
   a light receiving unit which receives the particular light transmitted by the wavelength variable interference filter; and
   a measurement control unit which changes the wavelength of light that can pass through the wavelength variable interference filter and measures spectral characteristics of the particular light having passed through the wavelength variable interference filter based on the particular light received by the light receiving unit.

2. The spectrometer according to claim 1, wherein the peak wavelength of the second light is within a range of 385 nm to 450 nm.

3. The spectrometer according to claim 1, wherein the first light source emits white light.

4. The spectrometer according to claim 1, wherein the first light source further comprises a tungsten lamp.

5. The spectrometer according to claim 1, wherein the second light source further comprises a violet LED.

6. The spectrometer according to claim 1, wherein
   the first light source further comprises a tungsten lamp; and
   the second light source further comprises a violet LED.

7. The spectrometer according to claim 1, further comprising:
   a third light source which emits third light having a wavelength range of about 380 nm to about 780 nm; and
   a fourth light source which emits fourth light having a wavelength range of about 480 nm to about 610 nm.

8. The spectrometer according to claim 7, wherein the third light source comprises a blue LED and the fourth light source comprises a green LED.

9. The spectrometer according to claim 1, further comprising:
   a reflector which reflects the first light and the second light, and
   wherein the light mixer combines the first light and second light reflected by the reflector into the mixed light by multiple reflections within the light mixer.

* * * * *